(12) United States Patent
Beckmann et al.

(10) Patent No.: US 6,482,873 B1
(45) Date of Patent: Nov. 19, 2002

(54) PLASTIC COMPONENT SUBJECTED TO FRICTION

(75) Inventors: Carola Beckmann, Cremlingen (DE); Jochen Brand, Braunschweig (DE)

(73) Assignee: Fraunhofer-Gesellschaft zur Förderung der Angewandten Forschung e.V., München (DE)

( * ) Notice: Subject to any disclaimer, the term of this patent is extended or adjusted under 35 U.S.C. 154(b) by 0 days.

(21) Appl. No.: 09/700,742

(22) PCT Filed: May 18, 1999

(86) PCT No.: PCT/EP99/03411

§ 371 (c)(1),
(2), (4) Date: Jan. 4, 2000

(87) PCT Pub. No.: WO99/60059

PCT Pub. Date: Nov. 25, 1999

(30) Foreign Application Priority Data

May 18, 1998 (DE) .......................................... 198 22 272

(51) Int. Cl.$^7$ .................................................. C08J 5/14
(52) U.S. Cl. ........................ 523/149; 523/205; 523/206
(58) Field of Search ................................ 523/205, 206, 523/149

(56) References Cited

U.S. PATENT DOCUMENTS 4,504,543 A    3/1985   Yamashita et al.

*Primary Examiner*—Kriellion A. Sanders
(74) *Attorney, Agent, or Firm*—Crowell & Moring LLP

(57) ABSTRACT

A frictionally stressed plastic component, particularly an elastomer component, includes microcapsules which, when damaged, release at least one tribologically effective content substance.

8 Claims, No Drawings

PLASTIC COMPONENT SUBJECTED TO FRICTION

BACKGROUND AND SUMMARY OF THE INVENTION

The invention relates to a frictionally stressed plastic component. A preferred field of application are frictionally stressed seals, bearings and guiding elements made of plastic material.

In many applications, good frictional characteristics and a low wear are demanded of plastic components in order to ensure a durability of the components which is as high as possible. For improving the tribological characteristics, it is known to embed dry lubricants, such as $MoS_2$ or graphite, into the plastic materials. These are released during the abrasive wear of the plastic component and develop their friction-reducing and wear-reducing characteristic.

It is a disadvantage of this solution that only dry lubricants can be entered into the plastic materials. This considerably restricts the selection of usable lubricants. The use of lubricants which are not dry and particularly liquid lubricants is therefore completely eliminated. As a result, the selection of an optimal combination of lubricant and frictional partners is not permitted.

Another disadvantage of the above-mentioned solution is the fact that the dry lubricants enclosed as particles in the plastic material are held only mechanically in the plastic material environment. If the adjacent plastic material environment is partially removed by friction, a corresponding opening is created on the side facing the friction partner. Through this opening, the particles can leave the plastic material as well as the interactional area without carrying out their desired function. This is particularly disadvantageous if the friction partners are additionally protected from friction and wear by means of a liquid lubricant. In this case, the dry lubricant can easily be absorbed by the liquid lubricant and may be removed by it from the tribologically stressed area without developing its effect. This is particularly true when the liquid lubricant is additionally subjected to a revolution.

Another considerable disadvantage of the above-mentioned solution consists of the fact that the mechanical building-in of dry lubricants disadvantageously changes the mechanical characteristics of the plastic component. Thus, the components may become brittle, lose stability, or the resistance to temperature changes may be impaired. Particularly in the case of elastomer components, as a rule, the modulus of elasticity is reduced and, as a result, the deformation characteristics are impaired which can lead to a malfunctioning of the component, for example, leakages at sealing surfaces.

The invention is based on the technical problem of providing frictionally stressed plastic components into which arbitrary tribologically effective content substances can be built. The inclusion of the content substances in the plastic component should take place not only mechanically but, on the contrary, by chemical linkages with the plastic material. Also, the mechanical characteristics of the plastic starting material, and particularly its elasticity, should not be changed.

According to the invention, it is recognized that these problems will be solved by a plastic component, particularly an elastomer component. This elastomer component contains microcapsules, which in the event of their frictionally caused damaging, release at least one tribologically effective content substance that develops the desired friction-reducing and wear-reducing effect.

DETAILED DESCRIPTION OF THE INVENTION

The production of the microcapsules is generally known. The microcapsules are added to the plastic mass before the shaping of the plastic material and consist of a membrane shell and the content substances or filling substances enclosed therein. Shell materials as well as filling materials may consist of many different substances.

The used plastic material can be selected arbitrarily in the sense of the invention. Duroplastics or thermoplastics, for example, are suitable. Plastic materials, which are particularly suitable because of their elasticity, are elastomers, for example, those produced by injection molding.

As a result of a suitable selection of the shell material, an adaptation to the matrix material and the processing conditions can be ensured. Such an adaptation is generally known on the basis of its principles. The adaptation to the shell material is carried out such that the shell material enters chemical linkages with the plastic matrix. As a result of the chemical linkages, the microcapsules are fixedly connected with the matrix and a purely mechanical embedding as in the case of the dry lubricant particles according to the prior art is avoided. Thus, it is excluded that the microcapsule leaves the tribologically stressed area without any pouring-out of the content substance.

For the above-mentioned adaptation, it is advantageous for the membrane shell to also consist of a plastic material which, in addition, is not attacked by the content substance or substances. Content substances suitable for this purpose may be liquid or solid. Particularly, oils and greases are suitable for many applications, but also dry lubricants, such as $MOS_2$, TEFLON or graphite. By accommodating the content substances in microcapsules, a very large number of tribologically effective content substances are available which permit a flexible adaption of the content substances to the respective application. The simultaneous use of microcapsules with different content substances is also perceivable.

The microcapsules have an essentially round shape and a rather precisely adjustable diameter of from approximately 0.5 $\mu$m to 1,000 $\mu$m. The quantity of content substances in the component can be adjusted within wide ranges by way of the capsule volume and by way of the volume fraction of the capsules on the component volume. For most applications, a volume fraction of encapsulated content substances of maximally 25% of the component volume should be sufficient.

The use of the plastic components according to the invention would be advantageous wherever plastic materials are tribologically considerably stressed. Examples are seals (such as sealing rings, particularly radial packing rings), bearings (such as roller bearings and slide bearings) and guiding elements (such as guide rails, guide grooves, guide plates, guide pins). These applications are characterized in that the tribologically stressed points are always subjected to the same friction partner, for example, because of periodic mechanical movements of the friction partners. If the elastic characteristics also matter in the applications (for example, in the case of seals), a plastic matrix made of an elastomer would be useful.

For an efficient use of the microencapsulated content substances, it is useful to arrange microcapsules preferably or even exclusively in the tribologically stressed volume ranges of the component. Particularly in the case of large parts, the used quantity of microcapsules will then clearly be smaller, which results in a reduction of costs. Furthermore, the lubricants will emerge only at points at which they are needed.

The locally limited or reinforced installation of microcapsules into these tribologically stressed volume ranges takes place by suitable injection methods.

Best Implementation of the Invention

The plastic components according to the invention can advantageously be used in the case of components which consist of several plastic parts, for example, radial packing rings. Such sealing rings usually consist of elastomers with sealing lips attached by injection molding or gluing and made of a different material. The second material may, for example, be TEFLON or another wear-proof plastic material. Essentially only the sealing lip is tribologically stressed. In the sense of the invention, the sealing lip may be a microcapsule-containing elastomer, in the case of which the microcapsules contain a lubricating oil. According to, an embodiment of the present invention, only the volume range of the sealing lip contains microcapsules. The locally desired surface characteristics can therefore be implemented without changing the overall component characteristics.

What is claimed is:

1. A frictionally stressed component comprising:
   an injection molded elastomer; and
   a plurality of microcapsules that, when damaged, release at least one tribologically effective content substance.

2. A component according to claim 1, wherein the content substance is an oil, a grease, or a solid lubricant.

3. A component according to claim 1, wherein the microcapsules have a plastic membrane.

4. A component according to claim 1, wherein the microcapsules have a diameter in the range of between 0.5 $\mu$m and 1,000 $\mu$m.

5. A component according to claim 1, wherein the encapsulated content substance has a volume fraction that is a maximum of 25% of the component volume.

6. A component according to claim 1, wherein the microcapsules are in tribologically stressed regions of the component.

7. A component according to claim 1, wherein the microcapsules are present only in the tribologically stressed regions of the component.

8. A component according to claim 1, wherein said component is a seal, a bearing, or a guiding element.

* * * * *